May 24, 1938.  W. A. WULLE  2,118,127
HIGH SPEED VEHICLE
Filed July 26, 1933   4 Sheets-Sheet 1
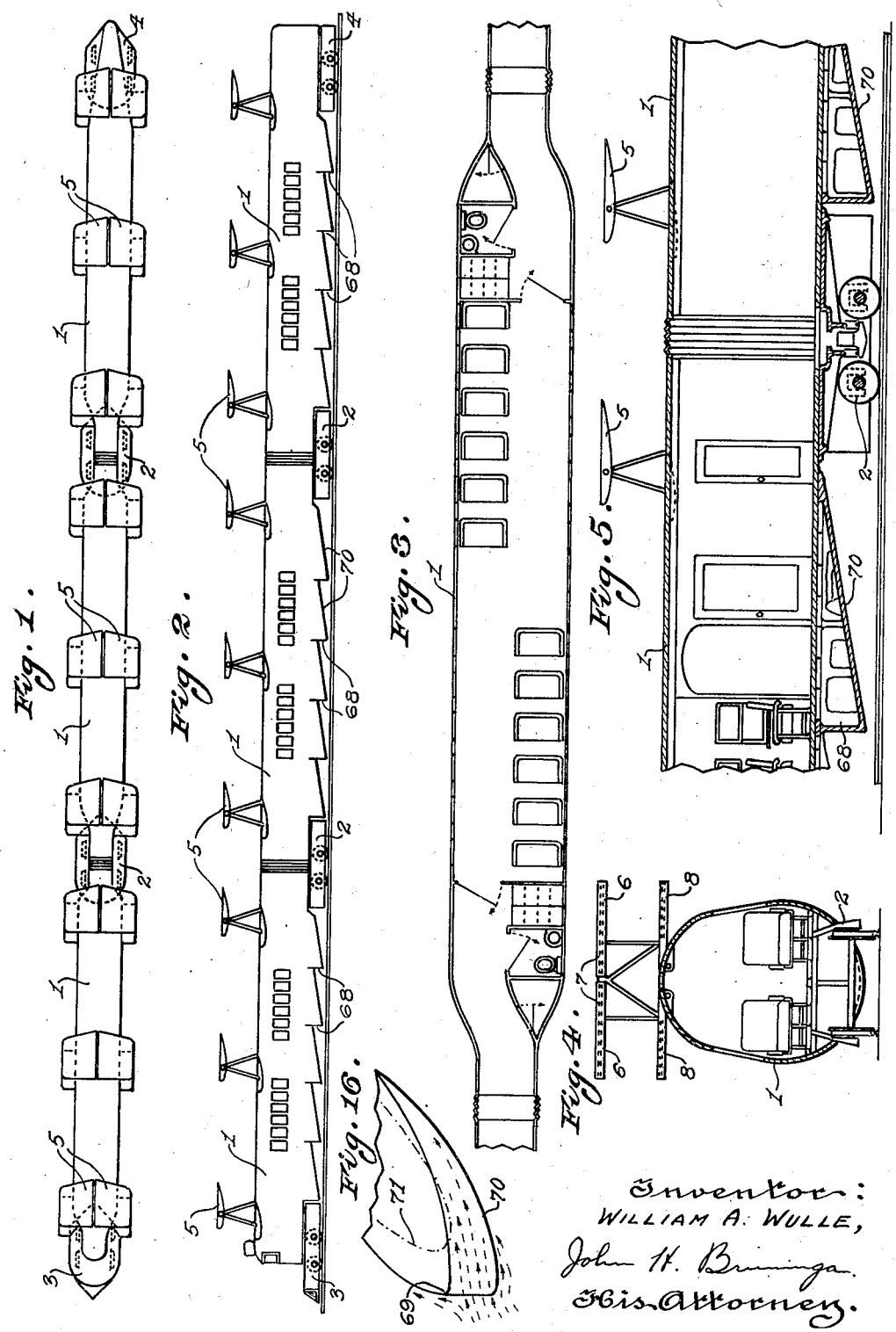
Inventor:
WILLIAM A. WULLE,
John H. Bruninga
His Attorney.

May 24, 1938. W. A. WULLE 2,118,127
HIGH SPEED VEHICLE
Filed July 26, 1933 4 Sheets-Sheet 2
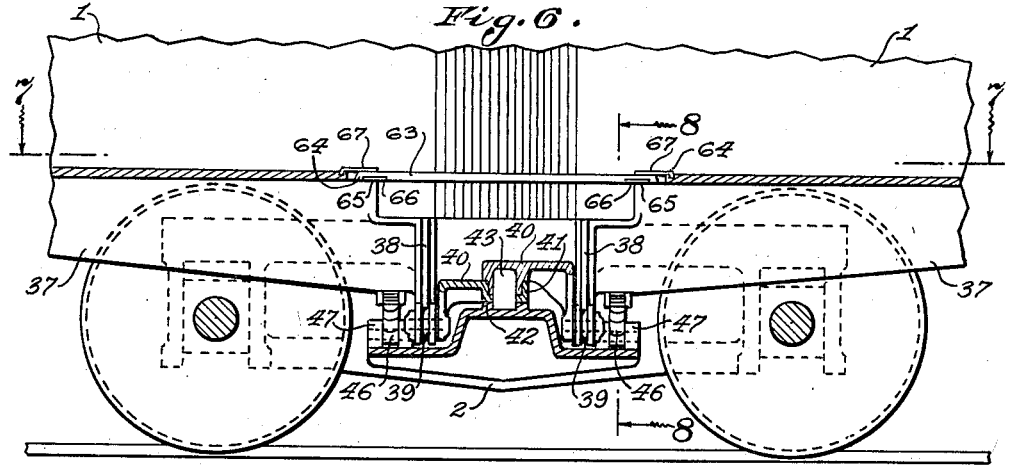
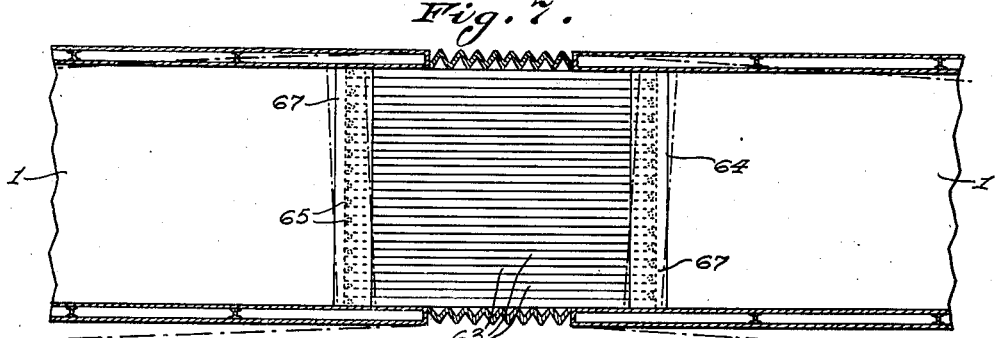
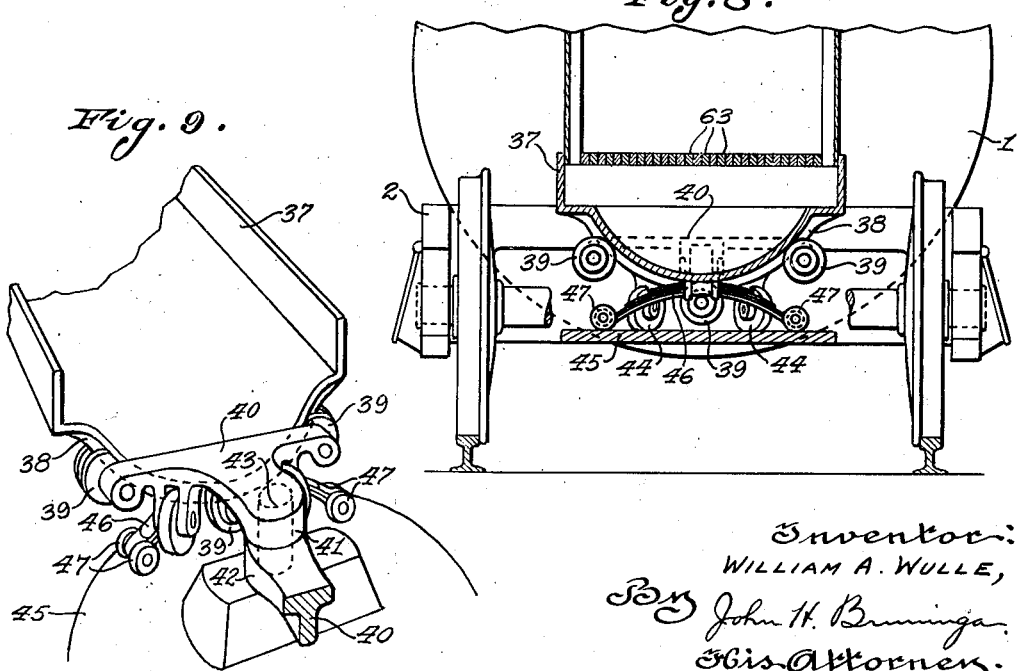
Inventor:
WILLIAM A. WULLE,
By John H. Brininger
His Attorney.

May 24, 1938.  W. A. WULLE  2,118,127
HIGH SPEED VEHICLE
Filed July 26, 1933  4 Sheets-Sheet 3

Inventor:
WILLIAM A. WULLE,
By John H. Bruninga
His Attorney.

May 24, 1938.  W. A. WULLE  2,118,127
HIGH SPEED VEHICLE
Filed July 26, 1933  4 Sheets-Sheet 4
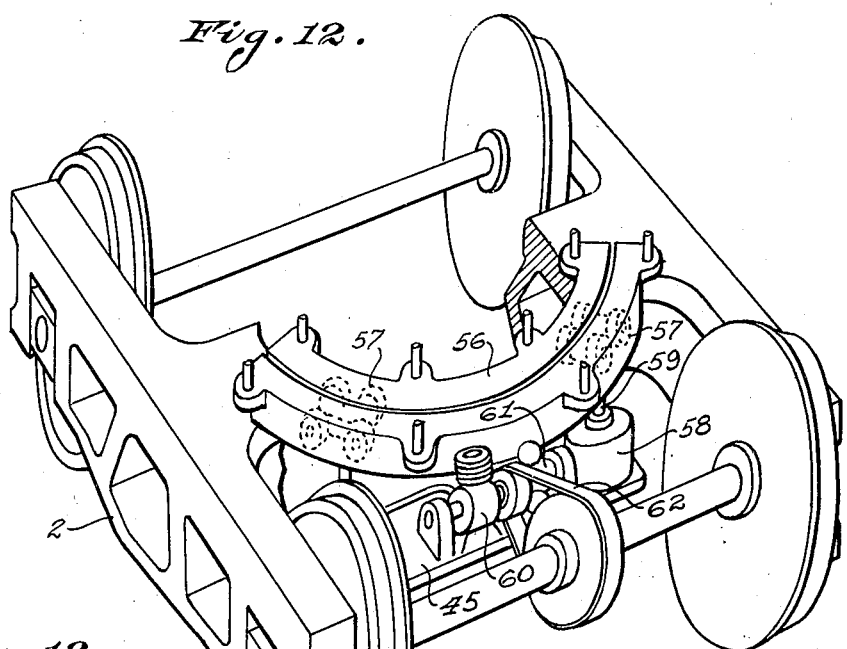
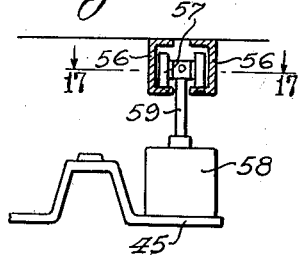
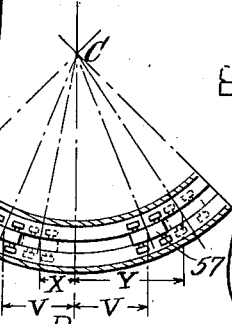
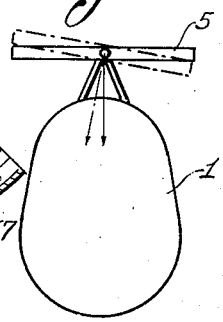
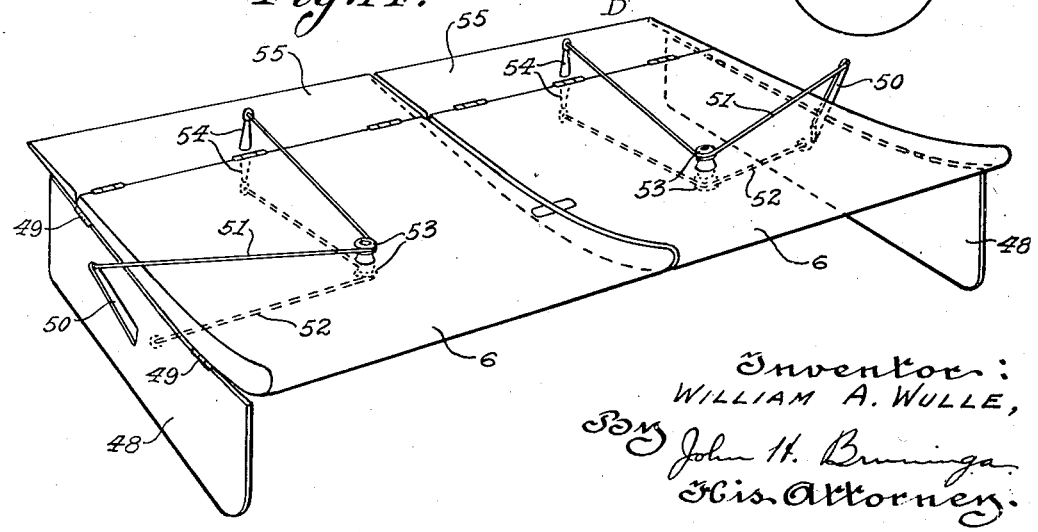
Inventor:
WILLIAM A. WULLE,
By John H. Bruninga
His Attorney.

Patented May 24, 1938

2,118,127

UNITED STATES PATENT OFFICE 2,118,127

HIGH SPEED VEHICLE

William A. Wulle, Chicago, Ill.

Application July 26, 1933, Serial No. 682,211

18 Claims. (Cl. 105—74)

This invention pertains to high speed cars and is intended to be applied more particularly to railway cars, although certain features thereof are applicable to other types of vehicles.

The main problem of modern rail transportation is to increase speed without sacrifice of safety or comfort. This must be accomplished without change in the type of track or road bed on account of the investment already made in such equipment. The present invention is intended to provide a car capable of traveling on the usual type of railroad track and which may be safely operated at speeds upwards of one hundred miles an hour. Two major considerations are involved in operations at such speeds. The first of these is the tendency of the car to leave the track on account of irregularities in the track. Provision must, therefore, be made to insure that the car will keep the track. The second consideration involves the question of banking the car on turns. In rounding curves at a high speed, banking is necessary in order that the effects of centrifugal force will be neutralized to such an extent as to avoid any tendency for the cargo to shift and also to insure comfort to passengers. The ordinary railroad track is banked to some extent. Banking cannot, however, be taken care of entirely by sloping the track, because the turn may be made at different speeds and the centrifugal forces involved vary with the speed.

Among other considerations involved in attaining high speeds may be mentioned the reduction to a minimum of train resistance, by which is meant the frictional resistance of the air on the moving car. This is best taken care of by proper stream lining of the car body, and where a train consisting of a number of cars is used, the junction between cars should be so designed as to vary the form of the body of the train as a whole to a minimum extent.

One of the objects of this invention, therefore, is to provide a car capable of travel at high speeds and which has means for insuring that it will keep the track.

Another object is to provide such a car which is capable of traveling at different rates of speed and having such safety appliances which will vary their action in accordance with their rate of travel.

Another object is to provide arrangements for banking the car on turns, and in this case also adjustments of the banking means are automatically accomplished so as to vary their effect in accordance with the speed of travel.

Another object is to provide such devices in which the banking is accomplished by agencies other than the track itself.

Another object is to provide improvements in stream lining for the car body.

Another object is to provide improved means for making articulated connections between the different cars of a train.

Further objects will appear from the following description taken in connection with the accompanying drawings, in which Figure 1 is a plan view of a three-car train embodying this invention;

Figure 2 is a side elevation of the same;

Figure 3 is an enlarged horizontal section of one of the cars;

Figure 4 is a transverse vertical section of the same;

Figure 5 is a vertical, longitudinal partial section taken at the junction between two cars;

Figure 6 is an enlarged detail of Figure 5;

Figure 7 is a horizontal section on line 7—7 of Figure 6;

Figure 8 is a vertical section taken about on line 8—8 of Figure 6;

Figure 9 is a detail perspective view showing the connections of the car body to the articulated truck;

Figure 10 is an enlarged perspective view showing the control connections from the truck to the banking aerofoils;

Figure 11 is a sectional detail of Figure 10 taken along the axis of the shaft 23;

Figure 12 is a perspective view of the truck showing the connections of the pneumatic devices for banking the car;

Figure 13 is a detail of the banking device shown also in Figure 12;

Figure 14 is a perspective view showing means for stabilizing the car against the effects of side winds;

Figure 15 shows a modified form of banking control;

Figure 16 is an enlarged perspective detail of a portion of the under body showing the stream-lining;

Figure 17 is a partial, horizontal section, to a somewhat reduced scale, taken about on line 17—17 of Figure 13.

In accordance with this invention the car is equipped with one or more aerofoils, mounted preferably on the top of the car, which are capable of aerodynamic reaction with the relatively moving air as the car travels at a high speed. Such aerofoils are automatically controlled so as to apply forces to the car which will assist in adjusting the banking of the car to a suitable degree in accordance with the speed thereof. These aerofoils may also be automatically controlled to exert lifting or depressing forces on the car body. Thus as the car travels at a high speed, the aerofoils may be so adjusted as to exert a downward pressure tending to force the car firmly down upon the track and thus reduce any tendency to leave the track on account of irregularities.

The invention also provides pneumatic devices for accomplishing the banking of the car on turns, and these devices also act in accordance with the speed of travel.

Referring to the drawings, Figures 1 and 2 illustrate a three-car train, each car comprising a body 1, the adjacent ends of two cars being articulated upon the same truck 2. The forward and rear ends of the terminal cars, of course, are provided with their own trucks 3 and 4, respectively. The car bodies may be suitably stream lined so as to offer a minimum resistance to the relatively moving air. Ordinarily the forward car would carry a power plant suitable for driving the train. The following cars may be arranged for carrying either passengers or goods. In the drawings a passenger car is illustrated. The car body is preferably designed for a minimum weight, and to this end reduced size and construction of the body out of aluminum or similar light metal is preferable. As illustrated in Figure 3, the car body is so reduced in size that its dimensions, inclusive of the surmounting aerofoils, are within the same limits as provided for modern ordinary railway cars.

Mounted on each car body is one or more sets of aerofoils, indicated generally at 5. In the embodiment illustrated there are three sets of aerofoils mounted on each car. These aerofoils may be of a design and construction similar to the ordinary aeroplane wing, as their reaction with the passing air is based upon the same principles as the action of such a wing. In the present case, however, the aerofoils are mounted in inverted position as compared with the position of an aeroplane wing. In other words, the cross-sectional form of the aerofoil is similar to that of an aeroplane wing, but it is mounted on the car with its concave side uppermost. Accordingly when set at the ordinary angle of incidence with respect to the wind, the aerofoil will exert a depressing force upon the car body.

In the preferred construction, each set 5 consists of a pair of upper aerofoils 6, each independently hinged upon a shaft 7 extending transversely thereof. The set also includes a pair of lower aerofoils 8 similarly hinged to the roof of the car body. These separate sections of the aerofoils are arranged to turn on their hinges so that their angle of incidence to the passing wind may be adjusted. Each lower section 8 moves for adjustment with the corresponding upper section 6. Adjustments may be so made that both sections 6 move together in the same direction or that they move independently in opposite directions, as will be more fully explained later.

When traveling on a straightaway, the adjustments of both sections of the aerofoils are made together—that is, they are adjusted at the same angle to the wind, and that angle may be varied in accordance with the speed of travel. Thus at a low speed, the angle may be so adjusted that the aerofoils exert a lifting force on the car body, thereby reducing the pressure on the bearings and rendering the starting and acceleration easier. At higher speeds, this angle is changed until above a certain predetermined speed the angle of incidence changes so that the aerofoils produce a depressing action tending to hold the car on the track. It will be appreciated that when the car is traveling at a high speed, the aerofoils will tend to resist any sudden change in a vertical direction and, accordingly, will tend to snub any tendency for the car to bounce or vibrate excessively on its suspension springs. Thus easier riding qualities are given to the car.

When the car enters a turn, the aerofoils are swung in opposite directions so that the sections on one side of the center of the car exert an increased depressing effect while those on the other side exert a lifting effect or decreased depressing effect, the result being to tip the car so that it assumes a banked position. Other devices are provided, as will be described later, to resist this banking force with a counter-force increasing with the degree of banking movement of the car body, so that a balance is attained for each speed. It will be clear that under such arrangements it is desirable to have the weight of the car and its cargo evenly balanced with respect to its longitudinal center line. Accordingly a balanced arrangement of car plan, such as indicated in Figure 3, is desirable.

Referring now more particularly to Figures 4, 10, 11 and 14, the aerofoils 6, as has been said, are hinged on transverse shafts 7 journaled in suitable supports on the roof of the car. Control connections for the aerofoils are illustrated in Figure 10. Each shaft 7 carries a bevel gear 9 engaging a similar gear 10 on a vertical shaft 11 journaled in a suitable support or bracket on the car roof. The shaft 11 carries at its lower end a bevel gear 12 engaging a similar gear 13 on a shaft 14 also suitably journaled on the car body. The shaft 14 carries an arm 15 connected by a link 16 with a control arm 17 fixed to a shaft 18, whose connections will now be described. A similar line of connections extends to the other section 6, as will be seen from Figure 10. The shaft 18 is equipped at one end with a thread or worm 19, preferably of large pitch, engaging a corresponding thread in a suitable bracket or support 20 on the truck 2. The other end of the shaft 18 carries a sleeve 21 to which it is fixed by a pin 22 or other suitable connection. The sleeve 21 fits over a second shaft 23 suitably journaled and supported against end thrust upon the truck 2 and which forms an extension of the shaft 18. The shaft 23 carries a pulley 24 connected by a belt 25 to a pulley 26 on the car axle 27. The travel of the car, therefore, will drive the shaft 23 at a speed proportional to the speed of travel. This shaft 23 carries a collar 28 on which are pivoted a plurality of governor weights 29, only one of which appears in Figure 11. The weight 29 has a projection or toe engaging a suitable bearing member at the end of the sleeve 21, so that when the weight 29 moves outwardly under centrifugal force the sleeve 21 will be shifted to the right, Figure 11. A compression spring 30, confined between the hub of the arm 17 and the bracket 20, tends to force the sleeve 21 to the left, Figure 11, and thereby to force the governor weights 29 to their innermost position. It will be clear that when the shaft 23 is driven by travel of the car, centrifugal force of the governor weights will tend to move the sleeve 21 to the right, a distance corresponding to the speed of the car. This shift to the right causes the thread 19 to rotate the shaft 18 through an angle proportional to the extent of such shift. It will be seen that this movement swings the control arm 17 about the shaft 18 in accordance with the speed of travel of the car. The connections from the arm 17 to the aerofoil sections are such that this movement of the arm 17 will cause the two sections 6 to swing on their shafts 7 in the same direction. It will be clear, therefore, that these connections operate automatically in accordance with the speed of the car to vary the angle of incidence of the aerofoils to the passing wind. These adjustments are made, as already explained, so that the aerofoils exert a lifting force at low car speeds which is changed to a depressing force at high speeds.

The position of the arm 17 is so adjusted with respect to the truck 2 that at standstill the arm is in line, fore and aft, with the axis of the pivot on which the truck is swiveled. When the car is traveling, however, the shift of the shaft 18 moves the arm 17 laterally off center with respect to the axis of the truck. It will be seen that when the arm is in such off center position, movement of the truck on its pivot will tend to move the arm 17 bodily forward or rearward with respect to the car body. This forward or rearward movement has the effect of shifting the links 16 in the same direction. By tracing the connections it will be noted that, by moving these links 16 in the same direction, the areofoil sections 6 are swung on their shafts 7 in opposite directions. Accordingly when the car is traveling at a high speed, the arm 18 is shifted laterally, and if now the car enters a turn, the truck will turn on its pivot relatively to the car body, and this action will shift the two links 16 in the same direction and thereby swing the sections 6 in opposite directions. This movement is such that the aerodynamic forces applied by the sections 6 in their shifted position tend to exert banking forces on the car body. It will be noted that these changes are made automatically in accordance with the speed of travel and in accordance with the movement of the car around turns. These control connections are made to the leading truck of each car so that the changes take place as the car enters the curve.

Figures 6–9, inclusive, illustrate an improved articulated connection between cars. Each car is provided with an end frame 37 provided at its extremity with an arcuate rib 38 positioned transversely of the car body. This rib is adapted to engage in grooves in a set of three rollers 39 mounted on a pivot bracket 40. These brackets 40 are similar except that the one on one car fits into a socket 41 in the other while the second one fits into a similar socket 42 on the truck bolster. Both brackets receive a pivot pin 43 also on the bolster. The bracket 40 is also provided with a pair of supporting rollers 44 adapted to roll on a horizontal plate 45 on the truck bolster. It will be seen that the rib 38, seated in the grooves of the rollers 39, provides a connection between the truck and the car body adapted to transmit the propelling force or draw-bar pull from car to car. At the same time this connection provides for rocking movement of the car body by permitting the rib 38 to travel in the rollers 39. The curvature of this rib is circular and, accordingly, the car body may rock on a longitudinal axis at the center of curvature of this rib. This permits movement of the car body in banking as already described.

Secured in any suitable manner to the frame 37 is a spring 46 equipped at its ends with rollers 47 which are also arranged to roll on the plate 45. This spring is flexed when the car body is banked and, accordingly, will resist such movement with a force which increases with the extent of the movement. This force opposes the banking force exerted by the aerofoils and, accordingly, the car body will be banked to such a position that the force of the aerofoils is balanced by the resistance of the spring 46.

A car traveling at high speeds is subjected to forces of considerable magnitude produced by the pressure of winds. These may be direct side winds when the car travels on a straightaway, or may be a wind pressure produced on the outer side of the car body in rounding a curve. These are unbalancing forces and provision is made for stabilizing the car thereagainst. Figure 14 shows a pair of control members 48 in the form of vertically positioned planes or aerofoils. These are arranged to be deflected by side winds. They may be hinged, as at 49, to the underside of the aerofoil sections 6, or to any other suitable support. They are so positioned that side winds will tend to swing them on their hinges. Each member 48 may be provided with an arm 50 extending above the aerofoils 6. Connections of any suitable type, such as bands or cords 51 and 52, pass from the arm 50 and from the body of the member 48 around pulleys 53 to suitable horns 54 for controlling the ailerons 55 on the aerofoil sections 6. These connections are so arranged that a side wind impinging on the members 48 will move the same and thereby operate the connections 51 and 52 to swing the ailerons 55 in such directions as to counteract the tendency of the wind and thereby stabilize the car. For example, a wind from the left, Figure 14, would move the left-hand member 48 inwardly and the right-hand member outwardly. This would act to pull the left-hand cord 51 and the right-hand cord 52, with the result that the left-hand aileron 55 would be tipped upwardly and the right-hand one downwardly. The reaction of the air stream on the ailerons so positioned would tend to bank the car to the left, against the effect of the wind.

Figure 12 shows a modified form of device for automatically controlling the banking of the car. In this device the underside of the car body is provided with a circular track 56 adapted to receive and guide a small truck or dolly 57. Mounted in any suitable manner on the truck 2 is a pair of pneumatic cylinders 58 whose piston rods 59 are connected to the dollies 57. Steam or air pressure is admitted to the cylinders 58, and the pressure is maintained equal in both cylinders. Furthermore, these cylinders are positioned at equal distances on opposite sides of the center line of the car. A control valve 60 is connected with a centrifugal device 61 of any suitable type, driven by any suitable connection, such as the belt 62 from the car axle, and operates to regulate the pressure in the cylinders 58. This pressure may be supplied either from the air line or from a steam line in the case of a steam propelled train. The pressure being equal in both cylinders and each exerting a downward pull on its dolly, these pulls will be balanced with respect to the center line of the car so long as the car is traveling on a straightaway, because in this position the truck is alined with the car. When the truck enters a curve, however, one of the cylinders 58, together with its dolly 57, is shifted toward the car axis while the other one is shifted away from the axis. Accordingly their equal pulls will be acting at unequal radii with respect to the center line of the car. This can be seen from Figure 17, in which the line CD represents the centerline of the car body, C representing the center of curvature of the track 56. The dollies 57 are shown in full lines in their positions when traveling on a straight track, and in dotted lines in their positions on a turn. In the former position the force of the cylinders 58 is exerted at equal leverage represented by the equal displacements V—V of the two dollies from the centerline CD. In the latter position the displacements are unequal as at X and Y and the greater leverage, Y, will predominate to bank the car. Under these conditions, one of these forces will predominate and the car will be banked thereby. As the intensity of pressure in the cylinders 58 is controlled by the valve 60 to vary in accordance with the speed, the extent of banking will also be varied in accordance with the speed. A resisting device, such as the spring 40 described above, may be used in this case in a similar manner so as to control the extent of banking.

Figure 7 illustrates the construction of a bridge extending from car to car at the floor level so that passengers may pass from car to car. This bridge is flexible, so as to allow for the articulation on turns. This floor section, or bridge, is made up of a series of slats or bars 63 placed on edge and closely adjacent to one another, but entirely free to move endwise independently of one another. Each slat has a hook end, as shown at 64, which end is hooked over a transverse rib 65 on the floor of a car. A notch 66 in the underside of the slat 63 permits a certain degree of endwise movement with respect to the rib 65. These slats are thus laid into the grooves formed by the ribs 65 on the two car floors and their ends are then covered by a plate 67 to retain them in place. It will be seen that as the car bodies change their relative angle, these slats may shift endwise to accommodate such change while at the same time retaining an even level floor section or permitting said section to warp to accommodate different banking in the two cars.

In order to improve the conditions of air resistance, a special form is provided for the underside of the car body, so as to avoid excessive air resistance. The general practice is to place control mechanism, such as brake cylinders and the like, underneath the car, and these offer considerable resistance in their movement with respect to the air. In accordance with the present invention, the car body is provided underneath with a succession of compartments 68 adapted to house the various control devices. These may be positioned more or less regularly along the length of the car, and each has its forward end somewhat narrowed and rounded while it spreads laterally toward the rear of the car and at the same time its depth is decreased until it merges with the underside of the car body. This is illustrated in Figures 2 and 5. By providing these forms, the flow of air past this portion of the car body is less disturbed and may follow regular flow lines and, accordingly, the resistance is greatly reduced.

The general shape of this portion of the body is illustrated in the perspective view in Figure 16. The forward tip 69 of one of these compartments is rounded laterally so as to deflect the passing air to both sides. The lower edge 70 is also rounded and has a generally upward slope toward the rear. The edge 70 may be considered as having a reaction with the passing air stream similar to that of the forward edge of the wing of an airplane in inverted position. The air which passes under the edge 70 is deflected downwardly in a manner similar to the action of an airplane wing in deflecting the air upwardly at its leading edge. As is well known in the case of airplane wings, this upward deflection of the air has the effect of creating a partial vacuum over a certain area of the top surface of the wing. The effect of such a partial vacuum is to exert an additional lifting force on the wing as a whole. Similarly, in the present case, the downward deflection of the air at the edge 70 will produce a partial vacuum over a certain portion of the under surface, such portion being indicated roughly by the dotted line 71 in Figure 16. Each one of these compartments will produce a similar action. The total result of this action will be not only to cause a smoother flow of air along the under side of the car body, thereby reducing train resistance, but will also produce a series of these areas of partial vacuum, each of which exerts a certain downward force on the car body as a whole. These downward forces are effective in holding the car down upon the track and in this respect they add to the effect of the aerofoils mounted on the top of a car.

Instead of dividing the aerofoil 5 into sections 6, a solid aerofoil or single wing may be provided and arranged to pivot laterally, as indicated in Figure 15. This changes the direction of the downward thrust of the wing and operates to bank the car body.

It will be seen that this invention provides means whereby a car may be controlled at high speeds under practically all conditions liable to be encountered. The provision of aerofoils adapted to apply controlling forces to the car body adds to the safety of travel in insuring against the car leaving the rails and also in insuring a proper banking angle on turns. This is of considerable advantage in view of the fact that the road bed itself can only be banked for a certain definite speed and unless the car is traveling at that particular speed it will not be properly banked. In accordance with the present invention, banking of the car is automatically adjusted in accordance with the speed, and therefore the comfort of passengers is enhanced and the liability of shifting the cargo at high speeds is obviated.

Thus banking may be accomplished mechanically as well as by means of aerodynamic devices, so that where overhead space is an important factor, the mechanical devices may be applied.

The arrangements for stabilizing against side winds provides against irregularity and instability in the car which may be encountered on account of the high speed of travel and sudden arrival at turns or in regions of changed wind conditions.

The improved articulating connections between the truck and car bodies are such as to co-operate effectively with the banking devices so that each works at a high efficiency and the operation is smooth and under full control.

It will be understood, of course, that while this invention is directed toward a unitary car unit, individual features or sub-combinations thereof may be of utility by themselves without reference to other features. It will be understood that such individual features or sub-combinations are contemplated by this invention and within the scope of the appended claims. It is obvious that various changes may be made, within the scope of the appended claims, in the details of construction without departing from the spirit of this invention; it is to be understood, therefore, that this invention is not limited to the specific details shown and/or described.

Having thus described the invention, what is claimed is:

1. In combination with a ground-supported traveling car, an aerofoil mounted on the car for aerodynamic reaction with the relatively moving air, and means continuously activated in accordance with the speed of the car operating automatically to regulate the angle of incidence of said aerofoil in accordance with the speed of the car.

2. In combination with a ground-supported traveling car, an aerofoil mounted on the car for aerodynamic reaction with the relatively moving air, and means having connections operating in accordance with the speed of the car to adjust the same so as to exert a lifting force on the car at low speeds and a depressing force at high speeds.

3. In combination, a traveling car having a swiveled truck, means for banking the car, connections from said banking means to said truck operable on turns to adjust said banking means, and means for controlling the operation of said connections in accordance with the speed of the car.

4. In combination, a traveling car having a swiveled truck, means for banking the car, connections from said banking means to said truck, and means for controlling the operation of said connections in accordance with the turning movement of said truck and with the speed of the car.

5. In combination, a traveling car having a swiveled truck, an aerofoil adjustably mounted on said car adapted by reaction with the surrounding air to exert a banking force on the car, connections between said truck and said aerofoil adapted to control the adjustment of the latter in accordance with the turning movement of said truck, and means for adjusting said aerofoil in accordance with the speed of travel of the car.

6. In combination, a railway car having a swiveled truck, pneumatic means on said truck adapted to apply a banking force to the car, and means adapted to regulate said banking means in accordance with the turning movement of said truck.

7. In combination, a railway car having a swiveled truck, means on said truck operable on turns adapted to apply a banking force to the car, and means adapted to regulate said banking means in accordance with the speed of travel of the car.

8. In combination, a railway car having a swiveled truck, means on said truck adapted to apply a banking force to the car, means adapted to regulate said banking means in accordance with the turning movement of said truck, and means cooperating with said first regulating means adapted to regulate said banking means in accordance with the speed of travel of the car.

9. In combination, a traveling car, a swiveled truck therefor, means for mounting said car on said truck for transverse rocking movement thereon having controlling means adapted to constrain such movement to one of rotation about a longitudinal axis substantially fixed with respect to the car body.

10. In combination, a traveling car, a swiveled truck therefor, means for mounting said car on said truck for transverse rocking movement thereon having controlling means adapted to constrain such movement to one of rotation about a longitudinal axis substantially fixed with respect to the car body, and retarding means adapted to resist such rocking movement with an effort increasing in accordance with the extent of the movement.

11. In combination, a traveling car, a swiveled truck therefor, means for mounting said car on said truck for transverse rocking movement thereon having controlling means adapted to constrain such movement to one of rotation about a longitudinal axis substantially fixed with respect to the car body, said mounting means being constructed and arranged to transmit the draw-bar tractive effort effective for propelling the car.

12. In combination, a traveling car, a swiveled truck therefor, means for mounting said car on said truck constructed and arranged to provide for rocking movement of the car body on said truck and having controlling means adapted to constrain such movement to one of rotation about a longitudinal axis substantially fixed with respect to the car body.

13. In combination with a ground-supported traveling car, an aerofoil mounted on the car for aerodynamic reaction with the relatively moving air and having an aileron, a control member mounted on the car and positioned and adapted to receive and respond to side winds, and connections to said aileron controlled by said member adapted to manipulate said aileron so as to apply a stabilizing force to said car.

14. In combination with a ground-supported traveling car, an aerofoil mounted on the car for aerodynamic reaction with the relatively moving air and having an aileron, means for manipulating said aileron to apply a banking force to the car, a control member mounted on the car and positioned and adapted to receive and respond to side winds, and connections to said aileron controlled by said member adapted to manipulate said aileron so as to apply a stabilizing force to said car.

15. In combination with a car equipped to travel on rails, an aerofoil operating in accordance with the traveling speed to depress said car against the rails.

16. In combination, a traveling car, a truck therefor, and a laterally swiveled connection between said car and said truck having a bearing whereby said car is mounted on said truck for transverse rocking movement relative thereto on a longitudinal axis substantially fixed with respect to the car body.

17. In combination, a car adapted to travel on ground rails, a pair of aerofoils mounted for aerodynamic reaction with air moving relatively to the traveling car, and connections to said aerofoils operating in accordance with the traveling speed to shift said aerofoils to exert depressing force on said car.

18. In combination, a car adapted to travel on ground rails, a pair of aerofoils mounted for aerodynamic reaction with air moving relatively to the traveling car, said car having a part connected to be caused to swing laterally on turns, and connections from said part to said aerofoils operating in accordance with the traveling speed to shift said aerofoils to exert depressing force on said car varying with the traveling speed, and operating on turns to shift said aerofoils relatively to exert force directed so as to cause the car to bank on the turn.

WILLIAM A. WULLE.